US011144947B2

(12) United States Patent
Ahuja et al.

(10) Patent No.: US 11,144,947 B2
(45) Date of Patent: *Oct. 12, 2021

(54) MANAGING USER LOYALTY GROUPS AT POINT-OF-SALE ACCESSES

(71) Applicant: PAYPAL, INC., San Jose, CA (US)

(72) Inventors: Sumeet Ahuja, Milpitas, CA (US); Michael Charles Todasco, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/573,844

(22) Filed: Sep. 17, 2019

(65) Prior Publication Data

US 2020/0034867 A1     Jan. 30, 2020

Related U.S. Application Data

(63) Continuation of application No. 15/391,739, filed on Dec. 27, 2016, now Pat. No. 10,417,656.

(51) Int. Cl.
*G06Q 30/00* (2012.01)
*G06Q 30/02* (2012.01)
*G06Q 20/32* (2012.01)
*G06Q 20/38* (2012.01)

(52) U.S. Cl.
CPC ..... *G06Q 30/0226* (2013.01); *G06Q 20/3223* (2013.01); *G06Q 20/387* (2013.01); *G06Q 30/0238* (2013.01)

(58) Field of Classification Search
None
See application file for complete search history.

(56) References Cited

U.S. PATENT DOCUMENTS

| 9,749,366 | B1 | 8/2017 | Ramalingam et al. |
| 2003/0236704 | A1* | 12/2003 | Antonucci ............ G07F 7/1016 705/14.3 |
| 2004/0006478 | A1 | 1/2004 | Alpdemir et al. |
| 2005/0222906 | A1 | 10/2005 | Chen |

(Continued)

OTHER PUBLICATIONS

IP.com NPL Search Strategy dated Feb. 18, 2021. (Year: 2021).*

(Continued)

*Primary Examiner* — Matthew T Sittner
(74) *Attorney, Agent, or Firm* — Haynes and Boone, LLP

(57) ABSTRACT

A method for managing loyalty groups at point-of-sale (POS) accesses is discussed. The method includes determining that a user account is a member of a loyalty group, responsive to determining that a user device of the user account is used at merchant's POS. The method includes determining a loyalty membership type for the user account that indicates whether user details of the user account are accessible by the merchant. The method includes determining another user account from the loyalty group, the loyalty membership type further indicating whether the user details are accessible by the another user account. The method includes determining whether the loyalty membership type for the user account can be upgraded, and if so, providing communication to the user device to cause a user interface of the user device to display a prompt for providing access to additional user details to upgrade the loyalty membership type.

20 Claims, 6 Drawing Sheets

(56) References Cited

U.S. PATENT DOCUMENTS

| | | | |
|---|---|---|---|
| 2007/0073596 A1* | 3/2007 | Alexander | G06Q 40/00 |
| | | | 705/26.1 |
| 2008/0140528 A1 | 6/2008 | Ganz et al. | |
| 2008/0294994 A1 | 11/2008 | Kruger et al. | |
| 2009/0072020 A1 | 3/2009 | Hull | |
| 2010/0106580 A1 | 4/2010 | Etheredge et al. | |
| 2010/0106582 A1 | 4/2010 | Etheredge et al. | |
| 2010/0106589 A1 | 4/2010 | Etheredge et al. | |
| 2010/0211469 A1 | 8/2010 | Salmon et al. | |
| 2011/0270617 A1 | 11/2011 | Murta et al. | |
| 2011/0302079 A1 | 12/2011 | Neuhaus | |
| 2012/0296726 A1 | 11/2012 | Dessert et al. | |
| 2013/0045804 A1 | 2/2013 | Ruke | |
| 2013/0046604 A1 | 2/2013 | Jones et al. | |
| 2013/0144704 A1 | 6/2013 | Williams et al. | |
| 2013/0151388 A1* | 6/2013 | Falkenborg | G06Q 40/10 |
| | | | 705/35 |
| 2013/0226682 A1 | 8/2013 | Grossman | |
| 2013/0232046 A1 | 9/2013 | Chin et al. | |
| 2014/0172533 A1* | 6/2014 | Andrews | G06Q 30/0229 |
| | | | 705/14.27 |
| 2014/0229264 A1* | 8/2014 | Ross | G06Q 50/01 |
| | | | 705/14.27 |
| 2014/0344167 A1 | 11/2014 | Johnson et al. | |
| 2015/0161644 A1 | 6/2015 | Bamane et al. | |
| 2016/0072824 A1* | 3/2016 | Johansson | H04L 63/10 |
| | | | 726/7 |
| 2016/0300216 A1 | 10/2016 | Godsey et al. | |
| 2016/0352923 A1 | 12/2016 | Nah et al. | |
| 2017/0148046 A1* | 5/2017 | Akbarpour Mashadi | |
| | | | G06Q 30/0239 |
| 2018/0181981 A1 | 6/2018 | Ahuja et al. | |

OTHER PUBLICATIONS

STIC EIC 3600 NPL Search Report for parent U.S. Appl. No. 15/391,739 dated Dec. 11, 2018. (Year: 2018).*
STIC EIC 3600 Search report for U.S. Appl. No. 16/573,844 dated Feb. 24, 2021. (Year: 2021).*
STIC EIC 3600 Search report for U.S. Appl. No. 15/391,739 (parent application with similar claims) dated Dec. 11, 2018. (Year: 2018).*
IP.com Search Strategy (Year: 2021).*

* cited by examiner

MANAGING USER LOYALTY GROUPS AT POINT-OF-SALE ACCESSES

RELATED APPLICATIONS

This application is a continuation of Ser. No. 15/391,739, filed Dec. 27, 2016, all of which is incorporated herein by reference in its entirety.

BACKGROUND

Embodiments of the present disclosure generally relate to the field of communication systems and, more particularly, to accessing and managing user loyalty groups across communication systems at point-of-sale accesses.

Loyalty programs can be used to encourage customers to purchase goods and/or services at merchants. Loyalty programs can offer rewards, incentives, promotions, and discounts that can be applied toward purchase of goods and/or services. Loyalty programs typically allow customers to accumulate loyalty points that can be used to obtain the loyalty benefits. A payment system is a platform that facilitates management and transfer of funds between payment accounts. Each payment account can be associated with a separate user. Each payment account can have a balance of funds and/or a certain amount of loyalty points. A user can login to the payment account to access his or her accounts including loyalty points, manage the payment account, and access other functionality. However, in various situations it may be difficult for the user to access or even use his or her loyalty points.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
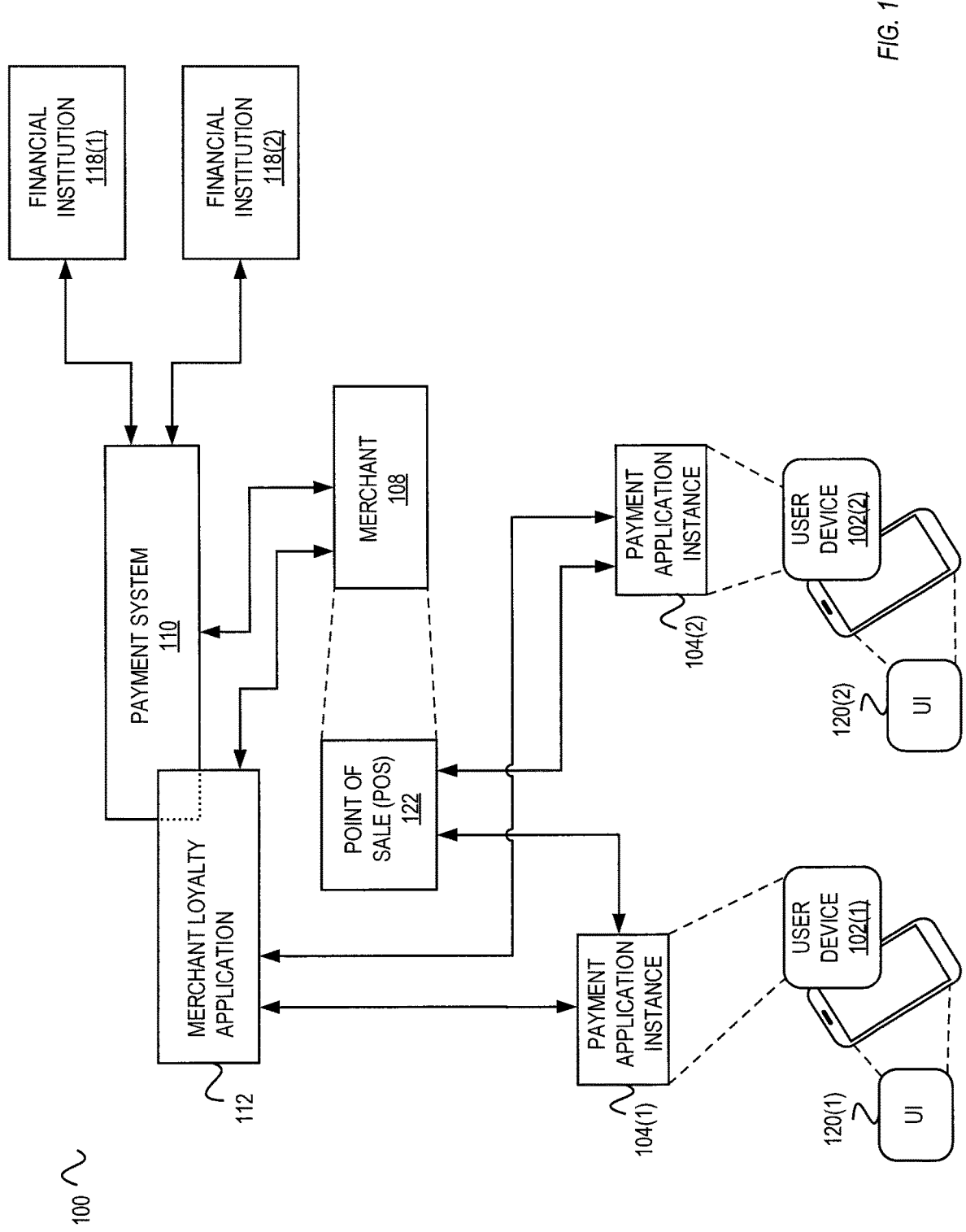
FIG. 1 is a system diagram illustrating embodiments of a communication system that includes a payment system and a merchant point-of-sale (POS).

The description that follows includes exemplary systems, methods, techniques, instruction sequences and computer program products that embody techniques of the present disclosure. However, it is understood that the described embodiments may be practiced without these specific details. For instance, although examples refer to point-of-sale (POS) accesses, accesses with other types of devices that interface with payment application instances are contemplated, including devices that manage loyalty programs but do not offer functionality to accept or process funds and/or payments.

Payment systems facilitate management and transfer of funds between payment accounts, where each payment account can be associated with a different user. Each payment account at the payment system can have a balance of funds. A payment account can also be used for loyalty programs. Loyalty programs typically refer to marketing programs that encourages user to purchase goods and/or services at certain merchants. Loyalty programs can offer rewards, incentives, promotions, and discounts (referred to collectively as "loyalty benefits" for simplicity) that can be applied toward purchase of goods and/or services. Loyalty programs typically allow users to accumulate loyalty points that can be used to obtain the loyalty benefits. It is noted that other techniques can be used to keep track of the purchases a user makes at a certain merchant and/or a group of merchants, including but not limited to miles, advantage points, and/or a number of visits to the merchant, among others.

User's loyalty points can be tracked using the user's payment account and/or via a separate loyalty account. A loyalty program can use a separate account for each merchant or a group of merchants. A user account can refer to a loyalty account, a payment account, or another account that maintains user's loyalty points and access to loyalty programs. For simplicity, the loyalty functionality portion of a user's payment account and a loyalty account are both collectively referred to herein a user account.

A merchant loyalty application can manage user's loyalty points. In some embodiments, the merchant loyalty application can use loyalty groups to facilitate management of loyalty points and/or loyalty benefits for groups of users. Each of the loyalty groups can include members, e.g., a set of users that have certain common characteristics. Members of a certain loyalty group can be associated with a loyalty membership type that characterizes the type and/or value of loyalty benefits available to that loyalty groups. The loyalty membership type can vary based on, for example, an amount of personal information that is known about the respective user of the loyalty group. Each member of the loyalty group can also have an associated number of loyalty points. In some embodiments, the members of a certain loyalty group can share loyalty points and/or loyalty benefits among each other.

In some embodiments, members of a certain loyalty group can upgrade their respective memberships by providing additional information about the members. The members of the loyalty groups can be known to a certain merchant, i.e., the merchant can access various user details on loyalty group members. The members of the loyalty group can know each other, i.e., a member can access various user details on other loyalty group members. The type of the loyalty membership can be determined by the merchant, and can be determined based on various factors, including how much user detail information is made accessible by the merchant. The user details can include user identity, user name, user address, user gender, shopping characteristics of the user, Internet usage characteristics of the user, and/or financial information of the user, among others. Depending on the type of loyalty membership, one or more user details can be made accessible to the merchant and/or other members of the loyalty group.

The merchant loyalty application can communicate with, or be hosted by, a payment system. The merchant loyalty application can manage loyalty membership of members at point-of-sale (POS) accesses. The merchant loyalty application can determine that a user device associated with a user account is used at the merchant's POS. In response to determining that the user device associated with the user account is used at the merchant's POS, the merchant loyalty application can determine that the user account is a member of a loyalty group. The merchant loyalty application can determine a loyalty membership type for the user account that indicates whether user details of the user account are accessible by the merchant. The merchant loyalty application can determine another user account from the group, the type of the loyalty membership further indicating whether the user details are accessible by the another user account. The merchant loyalty application can determine whether the loyalty membership for the user account can be upgraded. If the loyalty membership for the user account can be upgraded, the merchant loyalty application can communicate with the user device to cause a user interface of the user device to display a prompt for providing access to additional user details to upgrade the loyalty membership. The following description and associated Figures illustrate various embodiments directed to the ideas discussed above.

FIG. 1 is a system diagram 100 illustrating embodiments of a communication system that includes a payment system and a merchant point-of-sale (POS). In an overview of the system diagram 100, a user device 102(1) can access, via a payment application instance 104(2), a merchant 108 at a POS 122. The user device 102(1) can host the payment application instance 104(1), and the user device 102(2) can host the payment application instance 104(2). Each of the user devices 102(1) and 102(2) can also display a user interface (UI) 120(1) and 120(2), respectively. Each of the UIs 120(1) and 120(2) can display visual elements, such as a prompt for providing access to additional user details to upgrade a type of a loyalty membership. Each of the UIs 120(1) and 120(2) can also receive input from a user, such as a selection. It is noted that each of the user devices 102(1) and 102(2) can also receive input (i.e., for the UIs 120(1) and 120(2) respectively) from a user via other input elements, such as via a keyboard, mouse, microphone (e.g., from a voice command), among others.

A payment system 110 can provide payment services to the merchant 108 as well as to users of the user devices 102(1) and/or 102(2). The user device 102(1) can be associated with a first customer of the merchant 108, and a user device 102(2) can be associated with a second customer of the merchant 108. Both the user devices 104(1) and 104(2) can access the merchant loyalty application 112 via the payment application instances 104(1) and 104(2), respectively. The merchant 108 can provide goods and/or service to customers for purchase, such as via the POS 122. The merchant loyalty application 112 can implement and manage loyalty programs for at least some of customers that purchase goods and/or services from the merchant 108. As discussed above, the loyalty programs can offer various loyalty benefits for its members. Loyalty program members can include a portion of merchant's customers that select to be a part of at least one of the loyalty programs.

The payment application instances 104(1) and/or 104(2) can access the POS 122 to provide payment for a good or service provided by the merchant 108. The payment application instances 104(1) and/or 104(2) can also access the merchant loyalty application 112 to manage loyalty points and/or loyalty benefits for a respective member of a loyalty group. For example, a user of the user device 102(1) that is a customer at the merchant 108 can use the payment application instance 104(1) to pay for a product or a service at the POS 122. Upon determining that the payment application instance 104(1) is used at the POS 122, the merchant 108 can communicate with the merchant loyalty application 112 to determine whether a user account (e.g., associated with the payment application instance 104(1)) is a member of a loyalty group.

The merchant loyalty application 112 can manage the loyalty program for customers of the merchant 108. The merchant loyalty application 112 can communicate with the merchant 108 to indicate whether a customer (e.g., via the customer's user account) is a member of a certain loyalty group, a type of a loyalty membership for the customer, whether the loyalty membership can be upgraded, user details for the customer, and/or group details for the loyalty group, among others. The group details can include statistics and results of analysis on members of the loyalty group, such as demographics, shopping characteristics, Internet usage characteristics, and/or financial information, among others. The merchant loyalty application 112 can generate the group details based on the user details of members of the loyalty group. In some embodiments, the merchant loyalty application 112 can be implemented as a part of the payment system 110. In some embodiments, the merchant loyalty application 112 can be hosted and/or be implemented by a separate system, and communicate with the payment system 110. Depending on the type of loyalty membership, one or more of the user details can be made accessible to the merchant and/or other members of the loyalty group.

The payment system 110 can facilitate payments between a payment account associated with the payment application instance 104(1), a payment account associated with the payment application instance 104(2), and/or a payment account associated with the merchant 108. A payment is a transfer of a certain amount of funds from a buyer to a seller. The payment can be directed from the first payment account of a buyer (e.g., the user of the user device 102(1)) to the merchant 108 for a certain product or service provided by the merchant 108. The user device 102(1) can be used to access the first payment account at the payment system 110. A request to process the payment can be transmitted by the payment application instance 104(1) to the POS 122 of the merchant 108.

Financial institutions 118(1) and 118(2) (collectively referred to as financial institutions 118) can provide financial services to users. The financial institutions 118 can be implemented as banks, credit unions, other deposit-taking institutions that accept and manage deposits and make loans, and other financial service providers. In some embodiments, the financial institutions 118 can include credit card networks, e.g., for funding transfer of money between users. In some embodiments, the financial institutions 118 may include a provider of purchasing power that is associated with a loyalty program. In one embodiment, the payment system 110 can access funds associated with a buyer's payment account by accessing the financial institution 118 (1), and transfer these funds to a merchant's payment account by accessing the financial institution 118(2).

Figure 2:
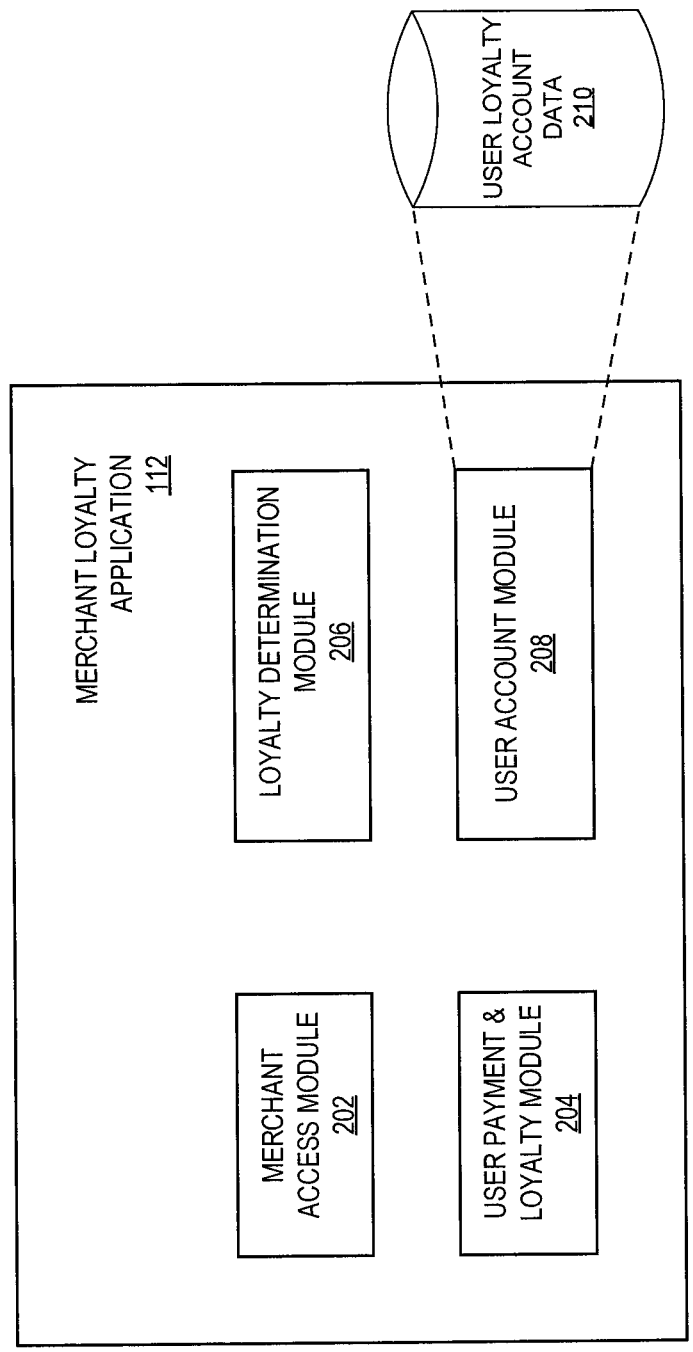
FIG. 2 is a diagram of a merchant loyalty application that interfaces between the merchant and a payment application instance of a user device, according to some embodiments.

FIG. 2 is a diagram of a merchant loyalty application that interfaces between the merchant and a payment application instance of a user device, according to some embodiments. In FIG. 2, the merchant loyalty application 112 includes a merchant access module 202, a user payment & loyalty module 204, a loyalty determination module 206, and a user account module 208. The user account module can communicate with a user loyalty account data 210.

The merchant access module 202 can access a merchant, such as the merchant 108. In some embodiments, the merchant loyalty application 112 can manage loyalty programs for a plurality of merchants, such as by using a separate merchant access module to communicate with each of the merchants. However, only one merchant 108 is shown in FIG. 1 for simplicity. The user payment & loyalty module 204 can interface with the payment system 110, such as to send and receive payments. The user payment & loyalty module 204 can also communicate notifications to the merchant 108 and/or the payment application instance 104(1) and/or 104(2) when a payment is processed.

The user account module 208 can determine whether a user account is a member of a group, such as by accessing the user loyalty account data 210. The user loyalty account data 210 can be stored at the payment system 110 and/or at a database system. The user loyalty account data 210 can store various user details for each member of each loyalty group, which can be accessible by the user account module 208. In some embodiments, the user loyalty account data 210 can be implemented by a third party, and provide a portion of user details for each member based on an authentication level of the user account module 208. The user loyalty account data 210 can store loyalty information for a plurality of loyalty groups and/or for a plurality of merchants.

The loyalty determination module 206 can determine whether another user account is a member of a loyalty group. The loyalty determination module 206 may use location of another device user (e.g., the user device 102(2)) in determining another user account that is associated with the user device 102(2). For example, the loyalty determination module 206 can determine whether any members of the loyalty group of the payment application instance 104(1) are in similar location (e.g., at the same merchant 108) as the user device 102(1). The loyalty determination module 206 can determine, for example, location of the user device 102(2) at a time the user device 102(1) is used at the POS 122. The loyalty determination module 206 can access Global Positioning System (GPS) data, or metadata, of communication from the user device 102(2). The loyalty determination module 206 can determine the location of the user device 102(2) based on data, such as GPS data, from the user device 102(2). The loyalty determination module 206 can also determine the device location based on Internet Protocol (IP) address or another identifier associated with the communication originating at the user device 102(2). The loyalty determination module 206 can determine the device location by triangulating the location of the user device 102(1), such as by using cellular data from the user device and/or WI-FI networks proximate to the user device 102(1).

Figure 3:
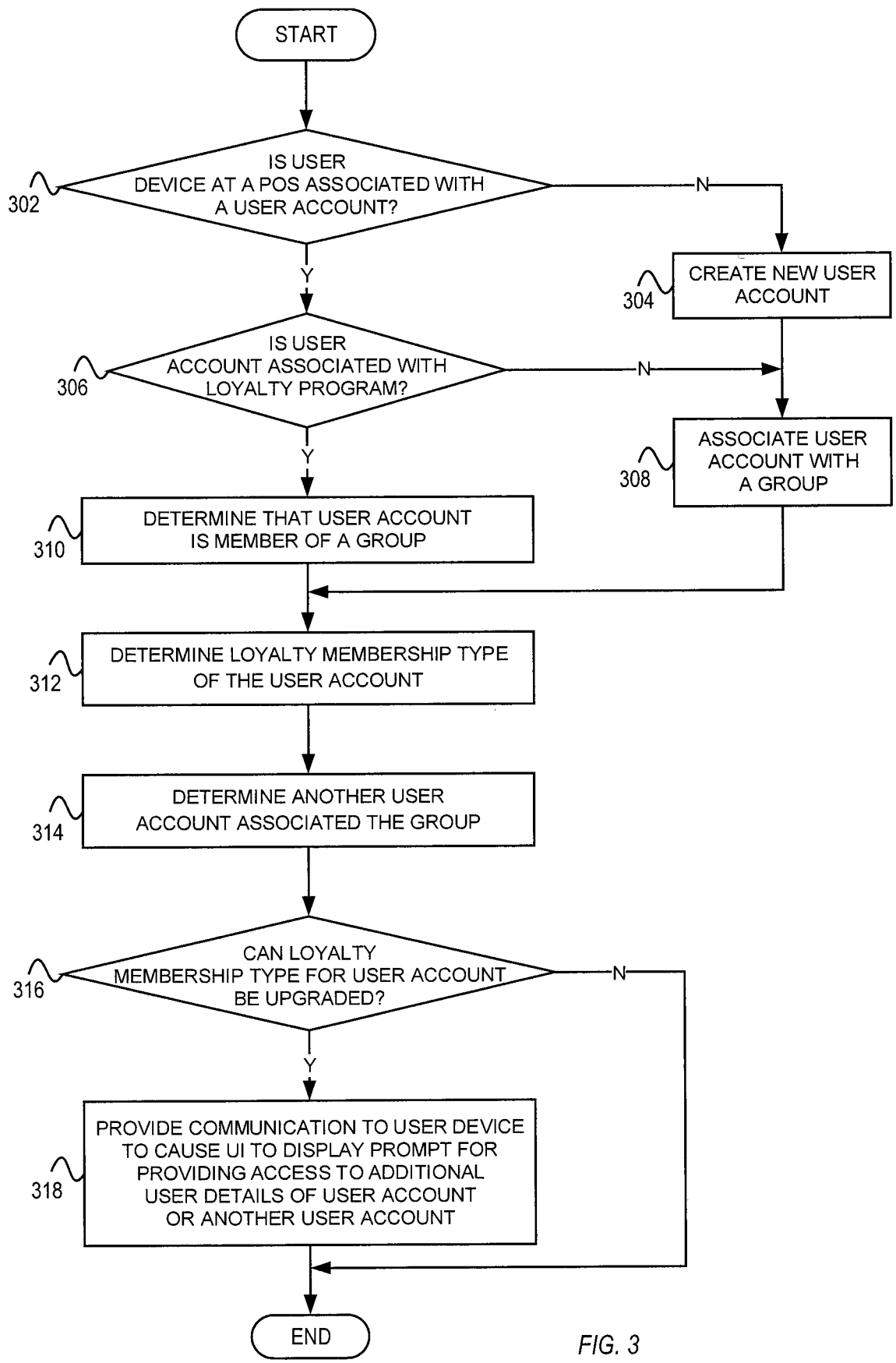
FIG. 3 is a flow diagram illustrating embodiments of operations for managing user loyalty groups at point-of-sale accesses.

FIG. 3 is a flow diagram illustrating embodiments of operations for managing user loyalty groups at point-of-sale accesses. The method of FIG. 3 is described with reference to the systems and components described in FIG. 1 (for illustration purposes and not as a limitation). The example operations can be carried out by the merchant loyalty application 112. It is noted that not all of the elements of the flow diagram of FIG. 3 need to be performed. For example, the POS 122 can be accessed by the payment application instance 104(1) which is associated with a certain loyalty program. In this example, the merchant loyalty application would proceed with element 310, without performing elements 302-308. Other variations are contemplated.

Beginning with 302, the merchant loyalty application determines whether a user device is associated with a user account. With reference to FIG. 1, the user device 102(1) can be used to access, via the payment application instance 104(1), the POS 122. The merchant loyalty application 112 can communicate with the POS 122 to determine whether the user device 102(1) (and/or the payment application instance 104(1)) is associated with a user account at the payment system 110 and/or at the merchant loyalty application 112. The user account can be an account at the payment system 110 that can be used for transferring payment funds to the merchant's 108 payment account. If the merchant loyalty application 112 determines that the user device is associated with a user account, flow continues to 306, otherwise the flow continues to 304.

At 304, the merchant loyalty application creates a new user account. For example, the merchant loyalty application 112 can create a new user account at the payment system 110 and/or at the merchant loyalty application 112. From 304, the flow continues to 308. At 306, the merchant loyalty application determines whether the user account is associated with a loyalty program. For example, the user account can be an account at the payment system 110 that can also be used to manage loyalty points and/or loyalty benefits for the user. The user account can be an account at the merchant loyalty application 112 that offers loyalty benefits when used at the merchant 108. If the user account is associated with a loyalty program, flow continues to 310, otherwise the flow continues to 308. At 308, the merchant loyalty application associates the user account with a group. For example, the merchant loyalty application 112 can associate the user account with a loyalty group for the merchant 108.

At 310, the merchant loyalty application determines that the user account is member of a group. For example, the merchant loyalty application 112 can determine whether the user account is a member of a loyalty group for the merchant 108. With reference to FIG. 2, the user account module 208 of the merchant loyalty application 112 can access the user loyalty account data 210 that stores data for the loyalty groups. In some embodiments, the user account module 208 can access the user loyalty account data 210 for the merchant 108 based on an identifier of the user device 102(1) (and/or based on an identifier associated with the user's user account) at the POS 122 to determine the user account in the loyalty group.

At 312, the merchant loyalty application determines a type of loyalty membership of the user account. For example, the merchant loyalty application 112 can determine a type of loyalty membership of the user account. In some embodiments, the type of loyalty membership (also referred to as loyalty membership type) can depend on the entities that can access the user detail of the user's user account. In some embodiments, the loyalty membership type can depend on whether the user detail is accessible by the merchant 108 and/or by other members of the loyalty group. For example, the loyalty membership type can be classified using quadrant classification, where the loyalty membership type is mapped to an x-y coordinate system.

Figure 4:
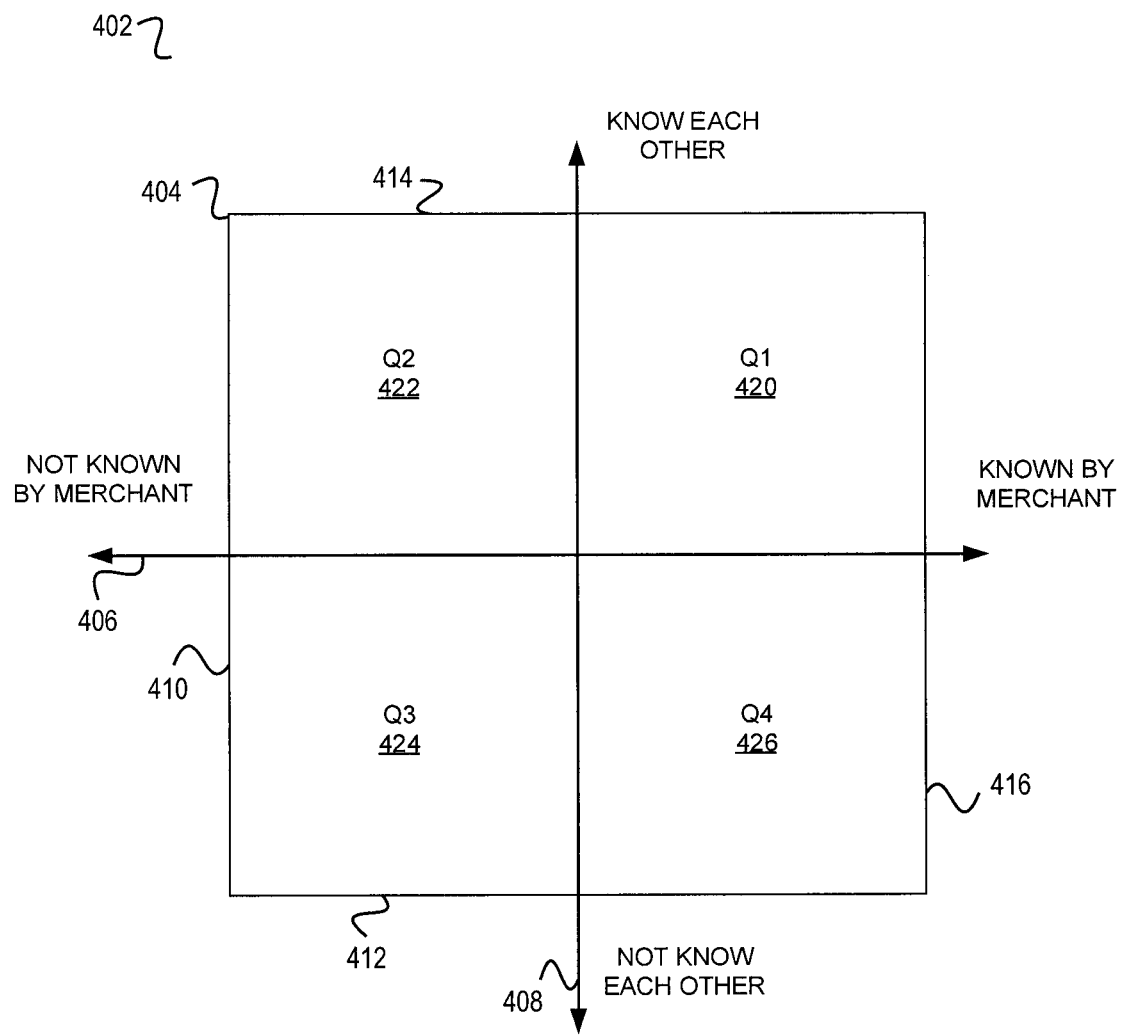
FIG. 4 illustrates an embodiment of an x-y coordinate system for mapping loyalty membership types using a quadrant classification.

FIG. 4 illustrates an embodiment of an x-y coordinate system 402 for mapping loyalty membership types using a quadrant classification. A square 404 in the x-y coordinate system 402 illustrates possible values of loyalty membership type for a certain user account. In some embodiments, the loyalty membership type can be classified as being placed somewhere in the square 404. An x-axis 406 of the coordinate system 402 can indicate a relative degree of whether the merchant can access user details of a certain user account. A y-axis 408 can indicate a relative degree of whether other members of the loyalty group can access the user details of a certain user account. A side 410 of the square 404 illustrates the maximum values of loyalty membership types where user details of a certain user account are not known by the merchant. A side 412 of the square 404 illustrates the maximum values of loyalty membership types where user details of a certain user account are not known to members of the same loyalty group. A side 414 of the square 404 illustrates the maximum values of loyalty membership type where user details of a certain user account are known to members of the same loyalty group. A side 416 of the square 404 illustrates the maximum values of loyalty membership types where user details of a certain user account are known by the merchant.

For example, if both the merchant 108 and other members of the loyalty group can access the user details, the loyalty membership type can be classified as quadrant I (Q1) 420. If only members of the loyalty group can access the user details, but the merchant cannot access, the loyalty membership type account can be classified as quadrant II (Q2) 422. If neither the merchant 108 nor other members of the loyalty group can access the user details, the loyalty membership type can be classified as quadrant III (Q3) 424. If only the merchant 108 can access the user details, and other members of the loyalty group cannot, the loyalty membership type can be classified as quadrant IV (Q4) 426. It is noted that in some embodiments, the loyalty membership type can be classified as simply being one of the four types, Q1-Q4.

In some embodiments, the loyalty membership type can depend on the amount of user detail that is accessible by the merchant 108 and/or by other members of the loyalty group. In some embodiments, a loyalty membership type of each account can be classified as being located somewhere in the square 404 of the coordinate system 402 of FIG. 4, described above. In some embodiments, a loyalty membership type can be classified using grades from (a) to (f) (for explanation purposes only), with (a) being the highest grade and (f) being the lowest grade. The (a) grade of the loyalty membership type can indicate a user account that provides all of the user details that are desirable by the merchant 108, and the (f) grade of the loyalty membership type can indicate a user account that only provides basic amount of user details. The classifications of the loyalty membership types can be used together. Thus, the user account can have a loyalty membership type of Q2 (c), meaning that the user account allows access to some user details with the other members of the loyalty group, but no user detail is accessible to the merchant 108.

In some embodiments, the merchant loyalty application 112 can broadcast communication to the other user accounts (e.g., via their respective payment application instances) of the loyalty group (i.e., ones that do not include the user account). The communication can request input indicating reputation of the user associated with the user account (also referred to as the requester). The merchant loyalty application 112 can receive back communication from the other user accounts with indications of reputation of the user. The merchant loyalty application 112 can determine the type of the loyalty membership based, in part, on the reputation of the user account.

Back to FIG. 3, at 314, the merchant loyalty application determines another user account associated with the group. With reference to FIG. 1, the merchant loyalty application 112 can determine a user account of the payment application instance 104(2) that is associated with the loyalty group of 310. In some embodiments, the merchant loyalty application 112 can determine a new user account associated with a new user device. For example, with reference to FIG. 1, the merchant loyalty application 112 can determine that the user device 102(2) used to access the POS 122 doesn't have a user account. The merchant loyalty application 112 can then determine a new user account associated with the user device 102(2) (such as with the payment application instance 104(2)). In this example, at 318 the merchant loyalty application 112 can provide the prompt to the UI 120(1) for providing user details for the new user account associated with the user of the payment application instance 104(2).

In some embodiments, the merchant loyalty application 112 can determine the another user account by determining a set of candidate user accounts from the user accounts in the loyalty group. The merchant loyalty application 112 can determine, based on the type of the loyalty membership, the another user account from the set of candidate user accounts. For example, the merchant loyalty application 112 can determine the set of candidate user accounts that share some characteristics as the user account. These shared characteristics can include access characteristics, indicating that the user detail of user accounts in the set of candidate user accounts can be accessed by the merchant loyalty application 112 and/or the merchant 108 (and where the user detail of user accounts outside the set of candidate user accounts is not accessible by the merchant loyalty application 112 and/or the merchant 108).

In some embodiments, the merchant loyalty application 112 can determine the another user account based on whether each of the candidate user accounts has indicated a promotion for sharing loyalty points with other user accounts in the loyalty group. For example, the user account associated with the payment application instance 104(2) can indicate that loyalty points can be shared with certain members of the loyalty group as a promotion. The promotion can be conditional on the merchant loyalty application 112 receiving additional user details at 318.

In some embodiments, the merchant loyalty application 112 can receive a request from a requesting user account requesting shareability of loyalty points from the user account. For example, the user account associated with the payment application instance 104(2) can send a request to the merchant loyalty application 112 requesting shareability of loyalty points from the user account. The request can indicate a permission to provide access to additional user details of the requesting user account with the merchant 108 and/or the merchant loyalty application 112. In this example, the merchant loyalty application 112 can determine the requesting user account as the another user account.

In some embodiments, the merchant loyalty application 112 can determine the another user account based on whether other user devices have been used to access the POS 122 within a certain amount of time. The merchant loyalty application 112 can then determine the candidate user accounts based on whether the other user devices are associated with user accounts. The merchant loyalty application 112 can determine the certain amount of time that has a certain probability of the user device still being at a same physical location as the merchant 108, or of being used again during a certain time period at the merchant 108.

At 316, the merchant loyalty application determines whether the loyalty membership for the user account can be upgraded. For example, the merchant loyalty application 112 can determine whether a loyalty membership type of the user account can be upgraded by providing additional user details on the user account and/or on the another user account. For example, with reference to the example discussed above where the user account has a loyalty membership type of Q2(c), the merchant loyalty application 112 can determine that additional user detail for the user account provided to the merchant 108 can change the loyalty membership type to Q1(c). The loyalty membership type of Q1(c) can indicate that both the merchant and the other members of the loyalty group are able to access some of the user details of the user account.

At 318, the merchant loyalty application provides communication to the user device to cause the user interface (UI) to display a prompt for providing access to additional user details of the user account or another user account. For example, the merchant loyalty application 112 can communicate with the user device 102(1) (e.g., via the payment application instance 104(1)) to cause the user device 102(1) to display, at the UI 120(1), a prompt for providing access to additional user details of the user account or another user account. The merchant loyalty application 112 can upgrade the loyalty membership type of the user account in response to receiving the additional user details. The merchant loyalty application 112 can determine a value of the additional user details and determine how to upgrade the loyalty membership type. For example, the merchant loyalty application 112 can determine the value of the additional user details based on desired characteristics of the merchant 108, on an amount of the additional user details, whether the additional user details are directed to the user account or to the another user account (such as the new user account), and/or the timeliness at which the additional user details are provided.

In a variation of 318 where a requesting user account offers additional user details about the requesting user account to obtain loyalty points from the user account, the merchant application 112 can use the additional user details. For example, the merchant loyalty application 112 can upgrade the loyalty membership type of the user account in response to receiving the additional user details from the requesting user account. The merchant loyalty application 112 can also provide additional loyalty points to the user account that are equal to, or exceed, the loyalty points provided to the requesting user account from the user account.

Figure 5:
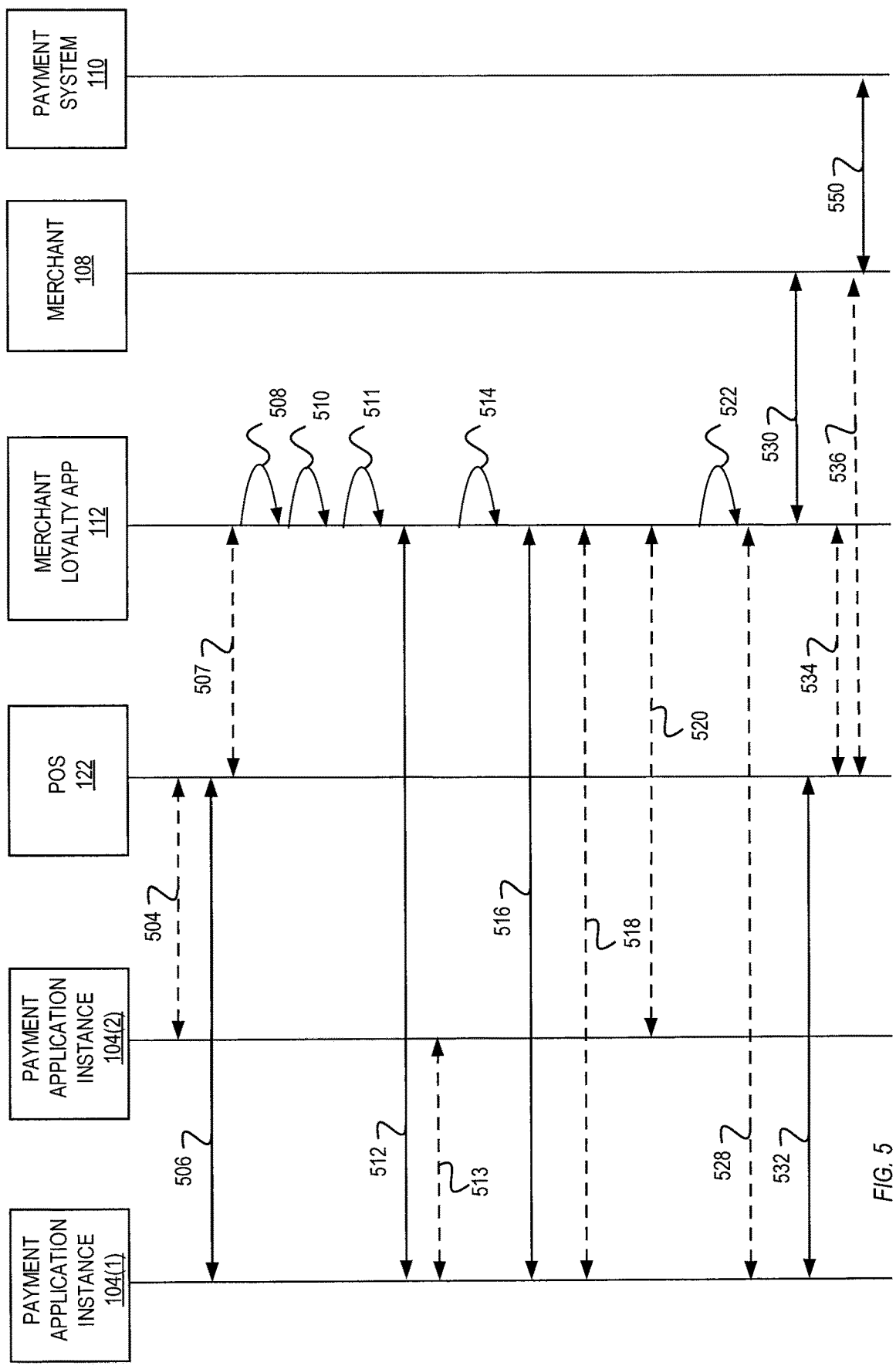
FIG. 5 is a timing diagram illustrating embodiments of communication between various entities for managing user loyalty groups at point-of-sale accesses.

FIG. 5 is a timing diagram illustrating embodiments of communication between various entities for managing user loyalty groups at point-of-sale accesses. The communications of FIG. 5 can be performed over one or more communication networks, such as shown by FIG. 5. Portions of the timing diagram of FIG. 5 correspond to the flow diagrams of FIG. 3. The timing diagram of FIG. 5 includes communication between payment application instances 104(1) and 104(2), the POS 122, the merchant loyalty application 112, the merchant 108 and the payment system 110.

At 504, the payment application instance 104(1) can access the POS 122. At 506, the payment application instance 104(2) can access the POS 122. At 507, the POS 122 can access the merchant loyalty application 112, such as to indicate to the merchant loyalty application 112 of the accesses by the payment application instance 104(1) and/or 104(2). At 508, the merchant loyalty application 112 can determine whether a user account associated with the payment application instance 104(1) is a member of a loyalty group. At 510, the merchant loyalty application 112 can determine a type of loyalty membership of the user account.

At 511, the merchant loyalty application 112 can determine whether another user account is associated with the loyalty group. At 512, the merchant loyalty application 112 can communicate with the payment application instance 104(1) to determine whether the payment application instance 104(1) can communicate directly with the payment application instance 104(2). At 513, the payment application instance 104(1) can communicate with the payment application instance 104(2), such as to obtain a permission to provide additional user details on the another user account associated with the payment application instance 104(2).

At 514, the merchant loyalty application 112 can determine whether a type of loyalty membership for the user account can be upgraded. At 516, the merchant loyalty application 112 can provide communication to the payment application instance 104(1) to cause the UI 120(1) of the user device 102(1) to display a prompt for providing access to additional user details of the user account or of the another user account. At 518, the merchant loyalty application 112 can communicate with the payment application instance 104(1) to obtain additional user details of the user account or of the another user account. At 520, the merchant loyalty application 112 can communicate with the payment application instance 104(2) to obtain additional user details of the another user account.

At 522, the merchant loyalty application 112 can upgrade the loyalty membership type of the user account. At 528 and 530, the merchant loyalty application 112 can communicate the loyalty membership to the payment application instance 104(1) and to the merchant 108, respectively. At 532, the payment application instance 104(1) can use the upgraded loyalty membership type (e.g., that offers additional loyalty benefits) to make a purchase at the POS 122. At 534 and 536, the POS 122 communicates with the merchant loyalty application 112 and/or the merchant 108 to apply the loyalty benefits to the purchase (made at 532 at the POS 122) by the payment application instance 104(1). At 550, the merchant can communicate with the payment system 110 to process a payment for the purchase, including the loyalty benefits.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagram of FIG. 3 and/or with reference to the timing diagram of FIG. 5 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 6:
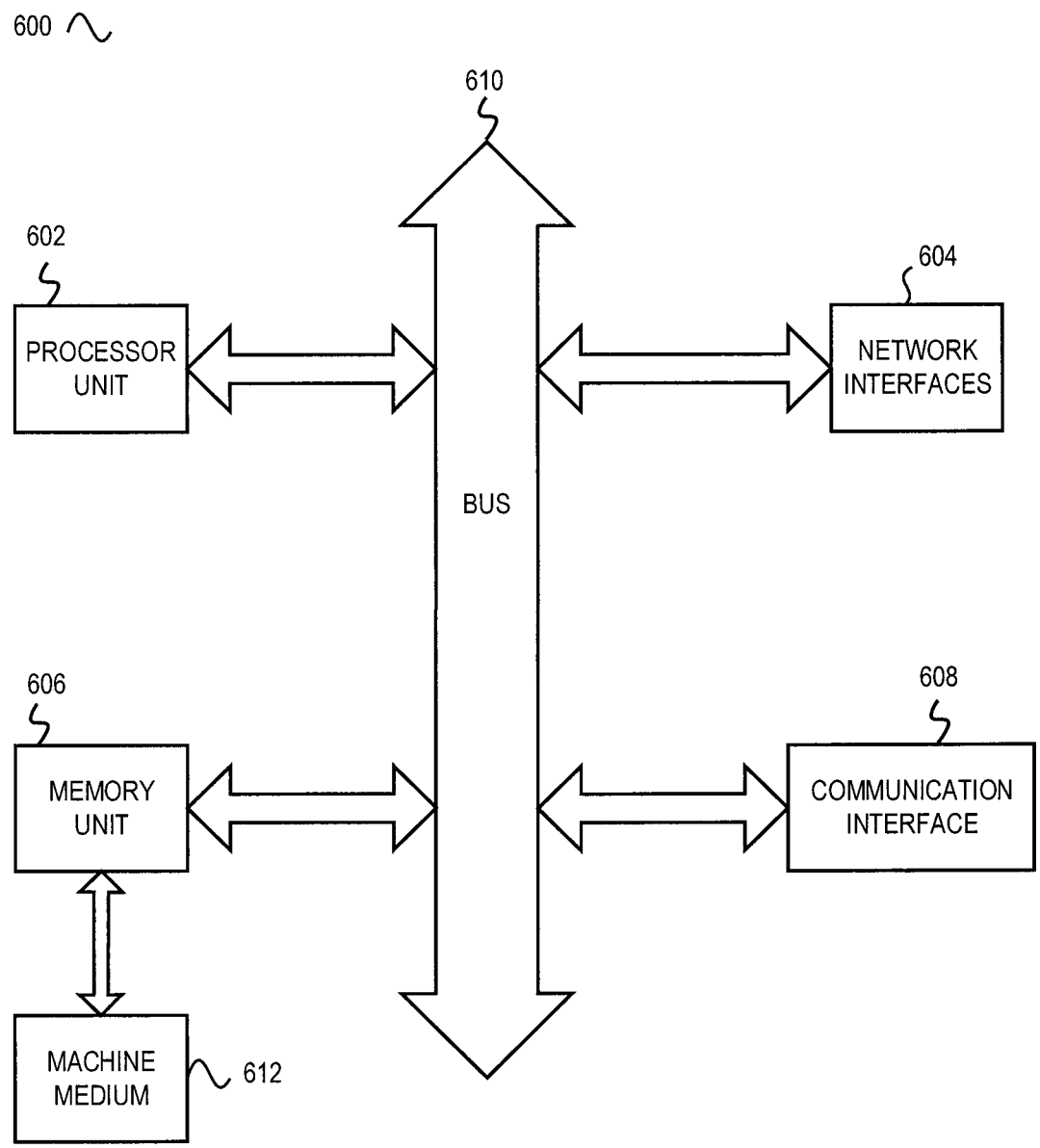
FIG. 6 is a block diagram of some embodiments of electronic devices used in the communication system of FIGS. 1 and 5.

FIG. 6 is a block diagram of some embodiments of electronic devices used in the communication systems of FIGS. 1 and 5. In some implementations, the electronic device 600 may be a laptop computer, a tablet computer, a mobile phone, a powerline communication device, a smart appliance (PDA), a server, and/or one or more electronic systems. For example, a user device may be implemented as a mobile device such as a mobile phone or a tablet computer. For example, a payment system may be implemented using one or more servers. The electronic device 600 can include processor unit 602 (possibly including multiple processors, multiple cores, multiple nodes, and/or implementing multi-threading, etc.). The electronic device 600 can also include memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 can also include bus 610 (e.g., PCI, ISA, PCI-Express, HyperTransport®, InfiniBand®, NuBus, AHB, AXI, etc.), and network interfaces 604 can include wire-based interfaces (e.g., an Ethernet interface, a powerline communication interface, etc.). The electronic device 600 includes a communication interface 608 for network communications. The communication interface 608 can include at least one of a wireless network interface (e.g., a WLAN interface, a Bluetooth interface, a WiMAX interface, a ZigBee interface, a Wireless USB interface, etc.). In some implementations, the electronic device 600 may support multiple network interfaces—each of which is configured to couple the electronic device 600 to a different communication network.

The memory unit 606 can embody functionality to implement embodiments described in FIGS. 1-5 above. In one embodiment, the memory unit 606 can include one or more of functionalities that access and manage user loyalty groups across communication systems at point-of-sale accesses. Any one of these functionalities may be partially (or entirely) implemented in hardware and/or on the processor unit 602. For example, some functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, the network interfaces 604, and the communication interface 608 are coupled to the bus 610. Although illustrated as being coupled to the bus 610, the memory unit 606 may be coupled to processor unit 602.

While the embodiments are described with reference to various implementations and exploitations, it will be understood that these embodiments are illustrative and that the scope of the present disclosure is not limited to them. In general, techniques for accessing and managing user loyalty groups across communication systems at point-of-sale accesses as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for managing loyalty groups at point-of-sale (POS) accesses, the method comprising:
   determining, by a processor and based on a first network communication from the processor to a POS of a merchant, that a user device associated with a user account is being used for a second network communication between the user device and the POS of the merchant;
   determining, by the processor, that the user account is a member of a loyalty group, wherein the determining that the user account is a member of the loyalty group comprises:
      accessing a user identifier of the user device being used for the second network communication with the POS of the merchant; and
      accessing a database that stores data associated with a plurality of loyalty groups including the loyalty group, wherein the user account is determined based on the user identifier and the data;
   determining, by the processor, a type of a loyalty membership for the user account, based on whether user details associated with the user account are accessible by a merchant account associated with the merchant;
   determining, by the processor, another user account from a plurality of user accounts of the loyalty group that comprises the user account, wherein the determining the other user account comprises:
      determining, by the processor, a set of candidate user accounts from the plurality of user accounts of the loyalty group based on whether each of the set of candidate user accounts has indicated a promotion for sharing loyalty points with the plurality of user accounts, wherein the other user account is determined based on the type of the loyalty membership;
   further determining the type of the loyalty membership based on whether the user details are accessible by the other user account;
   determining, by the processor, whether the type of the loyalty membership for the user account can be upgraded based on a quadrant classification of the type of the loyalty membership in an x-y coordinate system; and
   in response to determining that the type of the loyalty membership for the user account can be upgraded, providing, by the processor, a communication to the user device to cause a user interface of the user device to display a prompt for providing access to additional user details to upgrade the type of the loyalty membership.

2. The method of claim 1, wherein said determining the set of candidate user accounts comprises determining user accounts of the plurality of user accounts that have shared access characteristics.

3. The method of claim 1, wherein said determining the set of candidate user accounts comprises determining user accounts of the plurality of user accounts that have been used at the POS at a time that is within a time difference from which the user device was used at the POS.

4. The method of claim 1, further comprising:
   receiving a request from the other user account requesting shareability of loyalty points from the user account, the request indicating a permission to provide access to additional user details of the other user account with the merchant.

5. The method of claim 1, wherein said additional user details are for the user account or for the other user account.

6. The method of claim 1, further comprising broadcasting a communication to the plurality of user accounts of the loyalty group, the communication requesting an input indicating a reputation of the requester, wherein the type of the loyalty membership of the user account is based in part on the reputation of the user account associated with the requester.

7. The method of claim 1, further comprising broadcasting a communication to the plurality of user accounts of the loyalty group requesting sharing of a certain amount of additional loyalty points by a requester, wherein one or more of the plurality of user accounts hold a respective amount of loyalty points that are shareable.

8. The method of claim 1, further comprising:
   receiving the additional user details from the user device;
   determining a value of the additional user details; and
   based on the value of the additional user details, upgrading the type of the loyalty membership for the user account.

9. The method of claim 1, wherein the user details comprise at least one of a user identity, a user name, a user address, or an internet usage characteristic of the user.

10. A device, comprising:
   a non-transitory memory storing instructions; and
   a processor configured to execute the instructions to cause the device to:
      determine, by the processor and based on a first network communication from the processor to a point-of-sale of a merchant, that a user device associated with a user account is being used for a second network communication between the user device and the POS of a merchant;
      determine, by the processor, that the user account is a member of a loyalty group, wherein the determining that the user account is a member of the loyalty group comprises:
         accessing a user identifier of the user device being used for the second network communication with the POS of the merchant; and
         accessing a database that stores data associated with a plurality of loyalty groups including the loyalty group, wherein the user account is determined based on the user identifier and the data;
      determine, by the processor, a type of a loyalty membership for the user account based on whether user details associated with the user account are accessible by a merchant account associated with the merchant;

determine, by the processor, another user account from a plurality of user accounts of the loyalty group that comprises the user account, wherein the determining the other user account comprises:

determining, by the processor, a set of candidate user accounts from the plurality of user accounts of the loyalty group based on whether each of the set of candidate user accounts has indicated a promotion for sharing loyalty points with the plurality of user accounts, wherein the other user account is determined based on the type of the loyalty membership;

further determining the type of the loyalty membership based on whether the user details are accessible by the other user account determine, by the processor, whether the type of the loyalty membership for the user account can be upgraded based on a quadrant classification of the type of the loyalty membership in an x-y coordinate system; and in response to determining that the type of the loyalty membership for the user account can be upgraded, provide, by the processor, a communication to the user device to cause a user interface of the user device to display a prompt for providing access to additional user details to upgrade the type of the loyalty membership.

11. The device of claim 10, the processor is further configured to execute the instructions to cause the device to receive a request from the other user account requesting shareability of loyalty points from the user account, the request indicating a permission to provide access to additional user details of the other user account with the merchant.

12. The device of claim 10, wherein the processor is further configured to execute the instructions to cause the device to broadcast a communication to the plurality of user accounts of the loyalty group requesting an input indicating a reputation of the requester, wherein the type of the loyalty membership of the user account is based in part on the reputation of the user account associated with the requester.

13. The device of claim 10, wherein the processor is further configured to execute the instructions to cause the device to:

receive the additional user details from the user device;
determine a value of the additional user details; and
based on the value of the additional user details, upgrade the type of the loyalty membership for the user account.

14. The device of claim 10, wherein the user details comprise at least one of a user identity, a user name, a user address, or an internet usage characteristic of the user.

15. A non-transitory machine-readable medium having instructions stored thereon, the instructions executable, by a processor, to cause performance of operations comprising:

determining, by the processor and based on a first network communication from the processor to a point-of-sale (POS) of a merchant, that a user device associated with a user account is being used for a second network communication between the user device and the POS of the merchant;

determining, by the processor, that the user account is a member of a loyalty group, wherein the determining that the user account is a member of the loyalty group comprises:

accessing a user identifier of the user device being used for the second network communication with the POS of the merchant; and accessing a database that stores data associated with a plurality of loyalty groups including the loyalty group, wherein the user account is determined based on the user identifier and the data;

determining, by the processor, a type of a loyalty membership for the user account, based on whether user details associated with the user account are accessible by a merchant account associated with the merchant;

determining, by the processor, another user account from a plurality of user accounts of the loyalty group that comprises the user account, wherein the determining the other user account comprises:

determining, by the processor, a set of candidate user accounts from the plurality of user accounts of the loyalty group based on whether each of the set of candidate user accounts has indicated a promotion for sharing loyalty points with the plurality of user accounts, wherein the other user account is determined based on the type of the loyalty membership;

further determining the type of the loyalty membership based on whether the user details are accessible by the other user account;

determining, by the processor, whether the type of the loyalty membership for the user account can be upgraded based on a quadrant classification of the type of the loyalty membership in an x-y coordinate system; and in response to determining that the type of the loyalty membership for the user account can be upgraded, providing, by the processor, a communication to the user device to cause a user interface of the user device to display a prompt for providing access to additional user details to upgrade the type of the loyalty membership.

16. The non-transitory machine-readable medium of claim 15, wherein the operations further comprise receiving a request from the other user account requesting shareability of loyalty points from the user account, the request indicating a permission to provide access to additional user details of the other user account with the merchant.

17. The non-transitory machine-readable medium of claim 15, wherein the operations further comprise broadcasting a communication to the plurality of user accounts of the loyalty group requesting an input indicating a reputation of the requester, wherein the type of the loyalty membership of the user account is based in part on the reputation of the user account associated with the requester.

18. The non-transitory machine-readable medium of claim 15, wherein the operations further comprise:

receiving the additional user details from the user device;
determining a value of the additional user details; and
based on the value of the additional user details, upgrading the type of the loyalty membership for the user account.

19. The non-transitory machine-readable medium of claim 15, wherein the user details comprise at least one of a user identity, a user name, a user address, or an internet usage characteristic of the user.

20. The non-transitory machine-readable medium of claim 15, wherein the upgrade in the type of the loyalty membership includes additional loyalty points added to the user account.

* * * * *